(12) United States Patent
Calman et al.

(10) Patent No.: US 11,883,840 B1
(45) Date of Patent: Jan. 30, 2024

(54) ADHESIVE SHEET MATERIAL APPLICATION SQUEEGEE FEATURING BLADE LIQUID RESERVOIRS

(71) Applicant: Geek Wraps, Inc., Oakland Park, FL (US)

(72) Inventors: Kenneth J. Calman, Fort Lauderdale, FL (US); Kathryn S. Calman, Fort Lauderdale, FL (US)

(73) Assignee: Geek Wraps, Inc., Oakland Park, FL (US)

( * ) Notice: Subject to any disclaimer, the term of this patent is extended or adjusted under 35 U.S.C. 154(b) by 509 days.

(21) Appl. No.: 16/913,372

(22) Filed: Jun. 26, 2020

Related U.S. Application Data

(60) Provisional application No. 62/921,616, filed on Jun. 26, 2019.

(51) Int. Cl.
  *B05C 1/06* (2006.01)
  *B05C 17/10* (2006.01)
  *C09J 5/00* (2006.01)
  *B05C 1/00* (2006.01)

(52) U.S. Cl.
  CPC ............... *B05C 1/06* (2013.01); *B05C 1/006* (2013.01); *B05C 17/10* (2013.01); *C09J 5/00* (2013.01); *C09J 2301/50* (2020.08)

(58) Field of Classification Search
  None
  See application file for complete search history.

(56) References Cited

U.S. PATENT DOCUMENTS

| | | | | | |
|---|---|---|---|---|---|
| 1,060,518 | A | * | 4/1913 | Ward | ........................ B05C 1/06 118/201 |
| 6,325,885 | B1 | * | 12/2001 | Harrison | .................... C09J 5/00 156/307.3 |
| 10,363,404 | B2 | * | 7/2019 | Brown | ................ A61M 35/003 |
| 2012/0095426 | A1 | * | 4/2012 | Visscher | ............. A61F 13/5123 604/385.01 |
| 2019/0329013 | A1 | * | 10/2019 | Brown | ...................... A61L 2/18 |

* cited by examiner

*Primary Examiner* — Jethro M. Pence
(74) *Attorney, Agent, or Firm* — Ice Miller LLP

(57) ABSTRACT

Adhesive sheet material application squeegees are disclosed.

18 Claims, 4 Drawing Sheets

ADHESIVE SHEET MATERIAL APPLICATION SQUEEGEE FEATURING BLADE LIQUID RESERVOIRS

RELATED APPLICATION DATA

This application claims the priority benefit of U.S. Provisional Application Ser. No. 62/921,616, filed Jun. 26, 2019 and entitled "The Micro Cell Installation Squeegee," which is incorporated in its entirety herein by reference.

FIELD OF THE DISCLOSED EMBODIMENTS

The present disclosure relates to the application of adhesive sheet materials, and, more particularly, an arc squeegee and method for applying adhesive sheet materials.

BACKGROUND

Adhesive sheet materials are becoming the increasingly popular choice for advertising or otherwise displaying graphics on signs, automobiles, indoor and outdoor walls, indoor and outdoor floors, indoor and outdoor ceilings, buildings, and numerous other surfaces. Adhesive sheet materials typically have a display side bearing desired graphics, colors, texture, images, and/or text, and an application side that is coated with an adhesive substance and allows for application to various surfaces. The adhesive sheet material is typically applied in oversized sections and then cut or shaped to the desired shape and size. The size of the oversized sections and the size of the surface to which the adhesive sheet material is being applied vary greatly depending on the application.

One type of adhesive sheet material, which is commonly used in the vehicle wrap industry is vinyl paint wraps. Although vinyl paint wraps are common, vehicles can be customized using a variety of adhesive sheet materials and the customization can include, but is not limited to including, body color change and/or texture change.

Adhesive sheet materials are applied to surfaces that have a variety of unique features, such as contours, welded obstacles, edges, texture, and elements such as handles or windows. It is desirable to shape the adhesive sheet material around the surfaces' unique features. The adhesive sheet material is best applied once gently heated during the application process, the heat serving both to activate the adhesive and to render the adhesive sheet material more pliable and thus amenable to compliance with the application to the surface and its unique features. Generally, a heat source, such as an electric heat gun, a propane torch or other combustible gas torch is used to heat the adhesive sheet material. Typically, an electric heat gun is primarily used with a gas torch secondarily, as vinyl sheet material normally does not require a lot of heat while installing with the squeegee of the present invention.

Application of adhesive sheet material is a pressure sensitive process. Applying the wrong amount of pressure can result in improper installation of the adhesive sheet material. Difficulties often arise during application of adhesive sheet material to variations in the surface or irregular surface features, such as contours, welded obstacles, edges, texture, and elements such as handles or windows. Issues can arise if too little, too much, or non-uniform pressure is applied when installing the adhesive sheet material to variations in the surface or irregular surface features. These issues include gaps, air bubbles, or air-pockets in-between the surface and the adhesive sheet material and post application lifting of the adhesive sheet material from the surface caused by shrinkage of the adhesive sheet material after being overstretched. If the adhesive sheet material is not properly adhered to the surface, it can result in aesthetic problems, peeling off of the adhesive sheet material, and/or premature delamination from the adhesive sheet material causing future failure.

In order to aid in the smooth application of adhesive sheet material, it is desirable to use a lubricating liquid, such as a watery installation fluid, a soapy fluid, or any low viscosity liquid used for installations, in order to facilitate smooth application of hand force without undue friction that might warp the adhesive sheet material during application.

Currently, the art lacks a reliable and desirable apparatus and method for providing a continuous supply of a lubricating liquid to the adhesive sheet material as smoothing strokes are made to variations in the surface or irregular surface features, thereby applying the correct pressure, and preventing gaps, air bubbles, air-pockets, and lifting between the surface and the adhesive sheet material, while avoiding unwanted deformation of the adhesive sheet material.

Accordingly, there is a need for a device and a method to facilitate the provision of a continuous supply of a lubricating liquid to the adhesive sheet material as the adhesive sheet material is applied to the desired surface.

This application discloses improvements to those inventions disclosed and claimed in prior U.S. patent application Ser. No. 15/144,447, filed on May 2, 2016, now U.S. Pat. No. 9,975,319, which is a continuation of U.S. patent application Ser. No. 14/673,534, filed Mar. 30, 2015, now U.S. Pat. No. 9,327,480, which is a divisional application of U.S. patent application Ser. No. 14/294,137, filed Jun. 2, 2014, now U.S. Pat. No. 9,327,479, which claims the benefit of U.S. Provisional Application No. 61/956,067 filed Jun. 1, 2013, which applications are incorporated herein by reference in their entirety.

BRIEF SUMMARY

The present disclosure fills the need for a device and method that facilitates and addresses the shortcomings of the current devices for applying sections of adhesive sheet material to variations in the surface or irregular surface features and preventing gaps, air bubbles, air-pockets, and lifting between the surface and the adhesive sheet material.

The present invention includes a "micro cell" squeegee that becomes ready for use when an installer grasps the uncovered edge and dips the cell covered edge in water, a watery installation fluid, a soapy fluid, or any low viscosity liquid used for installations, or sprays the cell covered edge with the water or fluid, and begins using the wet edge of the squeegee for the appropriate wet process installation.

Due to the relatively acute angles the squeegee at which it is maintained with respect to target surface during installation, gravity keeps applying the liquid, that has accumulated and is held internally in the cells, outward to the covered edge until it is depleted and needs to be replenished.

This process allows the installer to work much more efficiently than was previously practiced by installers where the installer would just wet the surface of the covered edge of the squeegee, that in turn would not permit the edge to stay moistened for long. With this new technology it will allow for longer runs of installation time creating more productivity for the installer. This process can be on flat straight areas or complex substrate areas. Complex areas are areas of a substrate including but not limited to angles, extreme curves, deep narrow groves, crevices, dwells, channels and narrow channels and/or protrusions. The micro cell installation squeegee allows the covered edge of the squeegee to hold liquid for a longer period of time due to the micro cells filling with the liquid, holding it and allowing the covered edge to absorb the liquid as needed and stay wet for an extended period of time which can enhance the glide of the edge over normal temperature and/or heated adhesive articles preventing the edge to grip, wrinkle, deform or tear the various pressure activated and pressure sensitive adhesive articles.

According to one aspect of the present disclosure, an adhesive sheet material application squeegee is disclosed.

In some embodiments, the present invention includes an adhesive sheet material application squeegee for applying a liquid to a surface, comprising: (a) a gripping portion; (b) a flexible blade portion extending from the gripping portion, the flexible blade portion having a lateral surface comprising a series of voids or apertures adapted to receive a liquid, and having an application edge; and (c) an absorbent cover portion having interior and exterior surfaces and secured over at least a portion of the application edge, whereby the voids or apertures are adapted to receive a liquid from the interior surface upon oversaturation of the absorbent cover portion, and to contain that liquid, and whereby the voids or apertures are adapted to release that liquid to the absorbent cover portion as liquid is dispensed from the exterior surface.

In some embodiments, the voids or apertures may comprise apertures of sufficient size so as to be adapted to receive and contain a lubricating liquid through capillary action, and they may be arranged in a substantially uniform array in the lateral surface, or otherwise may comprise elongated voids or apertures aligned substantially perpendicular to the application edge. The voids or apertures may comprise elongated voids or apertures aligned substantially perpendicular to the application edge, and tapered toward the application edge. The size and shape of the voids or apertures and their dimensions may be determined depending upon the their internal volume and surface area with due regard to the viscosity of the lubricating liquid, with less viscous liquids typically requiring smaller interstitial spaces and more viscous liquids typically allowing larger interstitial spaces, and which may be determined with reference to the liquid volume requirements of the absorbent cover portion during use.

The voids or apertures may be disposed over a portion or all of the length of the application edge, and may be arrayed to supply lubricating liquid effectively to the interior contact surface of the absorbent cover portion to permit lubricating liquid to be taken up by and transported to the exterior contact surface of the application absorbent cover portion.

In other embodiments, the flexible blade portion may comprise two opposing lateral edges continuous with the application edge through curved corners, and the absorbent cover portion may be secured over at least a portion of the two opposing lateral edges.

In still other embodiments, the gripping portion comprises a gripping surface and a first rib protruding from the gripping surface, and the surface of the first rib may be rounded.

In yet further embodiments, the absorbent cover portion may be secured to the squeegee with adhesive or through stitching or by any other effective means not inconsistent with its described function.

In other embodiments, the application edge may be straight or arcuate, and may define a symmetric convex arc or an asymmetric convex arc.

In still other embodiments, the absorbent cover portion may cover only a portion of the first edge and only a portion of the distal edge or the entire distal edge, and the absorbent cover portion may cover only a portion of the distal edge. The absorbent cover portion may comprise a material selected from the group consisting of microfiber cloths, suedes, leathers, wool, cotton and hook and loop nylons.

Other more particular embodiments include an adhesive sheet material application squeegee for applying a liquid to a surface, comprising: (a) a gripping portion; (b) a flexible blade portion extending from the gripping portion, the relatively flexible portion having a lateral surface comprising a series of voids or apertures of sufficient size so as to be adapted to receive and contain a liquid through capillary action, and having an application edge, the elongated voids or apertures aligned substantially perpendicular to the application edge; and (c) an absorbent cover portion having interior and exterior surfaces and secured over the application edge, whereby the voids or apertures are adapted to receive a liquid from the interior surface upon oversaturation of the absorbent cover portion, and to contain that liquid, and whereby the voids or apertures are adapted to release that liquid to the absorbent cover portion as liquid is dispensed from the exterior surface.

Still other more particular embodiments include adhesive sheet material application squeegee for applying a liquid to a surface, comprising: (a) a gripping portion; (b) a flexible blade portion extending from the gripping portion, the flexible blade portion having a lateral surface comprising a series of voids or apertures of sufficient size so as to be adapted to receive and contain a liquid through capillary action, and having an application edge, the elongated voids or apertures arranged in a substantially uniform array in the lateral surface; and (c) an absorbent cover portion having interior and exterior surfaces and secured over the application edge, whereby the voids or apertures are adapted to receive a liquid from the interior surface upon oversaturation of the absorbent cover portion, and to contain that liquid, and whereby the voids or apertures are adapted to release that liquid to the absorbent cover portion as liquid is dispensed from the exterior surface.

The squeegee may include a first edge, a first gripping surface and at least one cover. The at least one cover is capable of being secured over the first edge and the first gripping surface. The first edge may comprises a convex arc.

The present invention has wide industrial applicability to the vast number of businesses including but not limited to graphics businesses, sign businesses, window tinting businesses, vehicle wrap businesses, vehicle body shops, vehicle paint businesses, home decor industry and automotive paint protection industries that regularly use various installation products. These businesses could benefit from the use of this apparatus on a regular basis as the invention allows an easier more efficient described installation process.

BRIEF DESCRIPTION OF THE DRAWINGS

The embodiments described herein and other features, advantages, and disclosures contained herein, and the manner of attaining them, will become apparent and the present disclosure will be better understood by reference to the following description of various exemplary embodiments of the present disclosure taken in conjunction with the accompanying drawing, wherein.

Figure 1:
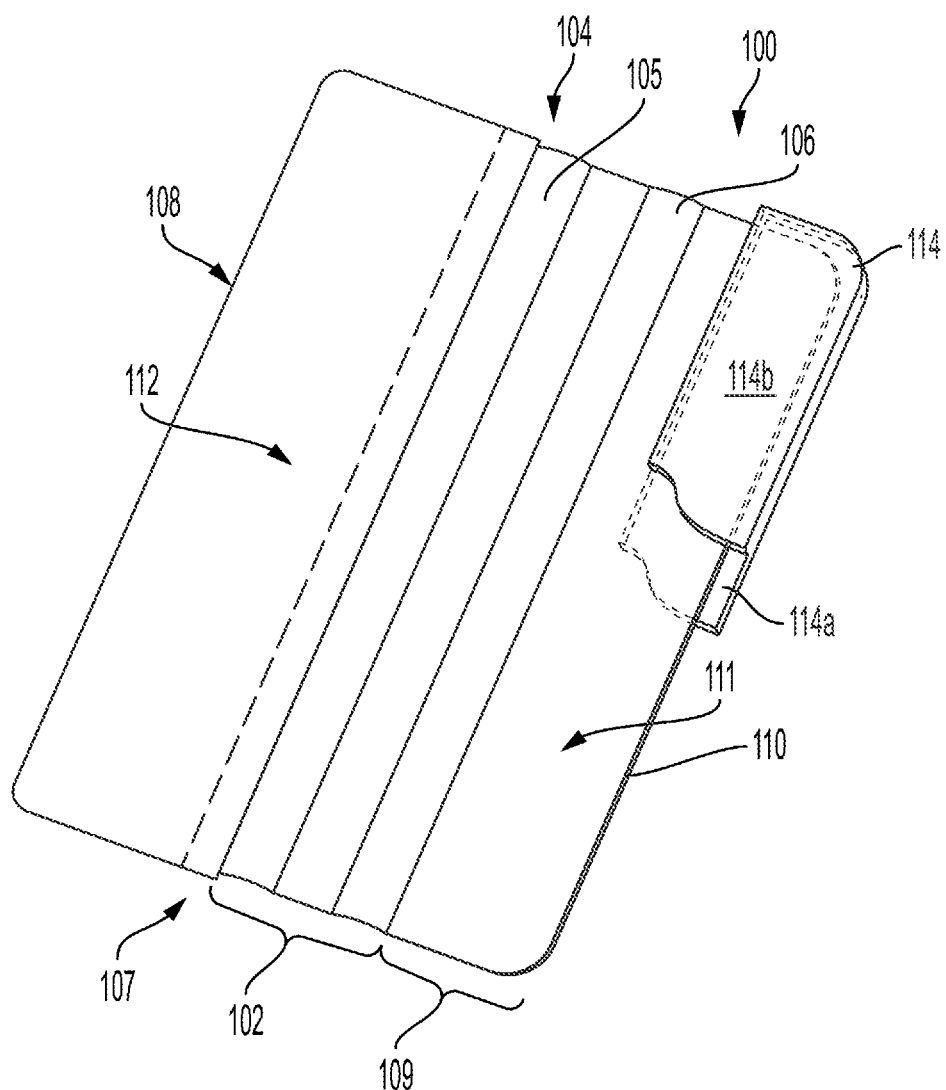
FIG. 1 is a lateral perspective view of an adhesive sheet material application squeegee according to at least one embodiment of the present disclosure.

It should be understood that the appended drawings are not necessarily to scale, presenting a somewhat simplified representation of various preferred features illustrative of the basic principles of the disclosure. Certain features of the illustrated embodiments have been enlarged or distorted relative to others to facilitate visualization and clear understanding. In particular thin features may be thickened, for example, for clarity or illustration.

DETAILED DESCRIPTION

For the purposes of promoting an understanding of the principles of the present disclosure, reference will be made to the embodiments illustrated in the drawings, and specific language will be used to describe the same. It will nevertheless be understood that no limitation of the scope of this disclosure is thereby intended.

The present disclosure includes disclosure of adhesive sheet material application squeegees and methods for using the same. FIG. 1 shows an adhesive sheet material application squeegee 100 according to at least one embodiment of the present disclosure. The embodiment of the adhesive sheet material application squeegee 100 shown in FIG. 1 comprises a base 102, a first side 104, a second side 107, a proximal edge 108, a distal edge 110 of relatively flexible distal portion 109, and a gripping surface 112. The proximal edge 108 is straight. The distal edge 110 is straight. As shown in FIG. 1, the gripping surface 112 is flat. The bases portion 102 between the proximal edge 108 and the distal edge 110 may be provided with one or more ridges, such as 105 and 106, to engage portions of the fingers or hand as the user grips gripping surface 112. Gripping surface 112 may be provided with a cover of a relatively high tack material such as leather, rubber or the like to aid in gripping and to prevent the fingers from sliding toward the distal edge 110 during use.

The relatively flexible distal portion (or flexible blade portion) 109 may be provided with a lateral surface 111 comprising a series of grooves, voids and/or apertures adapted to receive a liquid from the interior surface upon oversaturation of the absorbent cover portion 114 (having interior and exterior surfaces 114a and 114b, respectively, and secured over at least a portion of the application edge 110; shown sectioned), and to contain that liquid, and whereby the voids or apertures are adapted to release liquid to the absorbent cover portion 114 as liquid is dispensed from the exterior surface 111.

Figure 2:
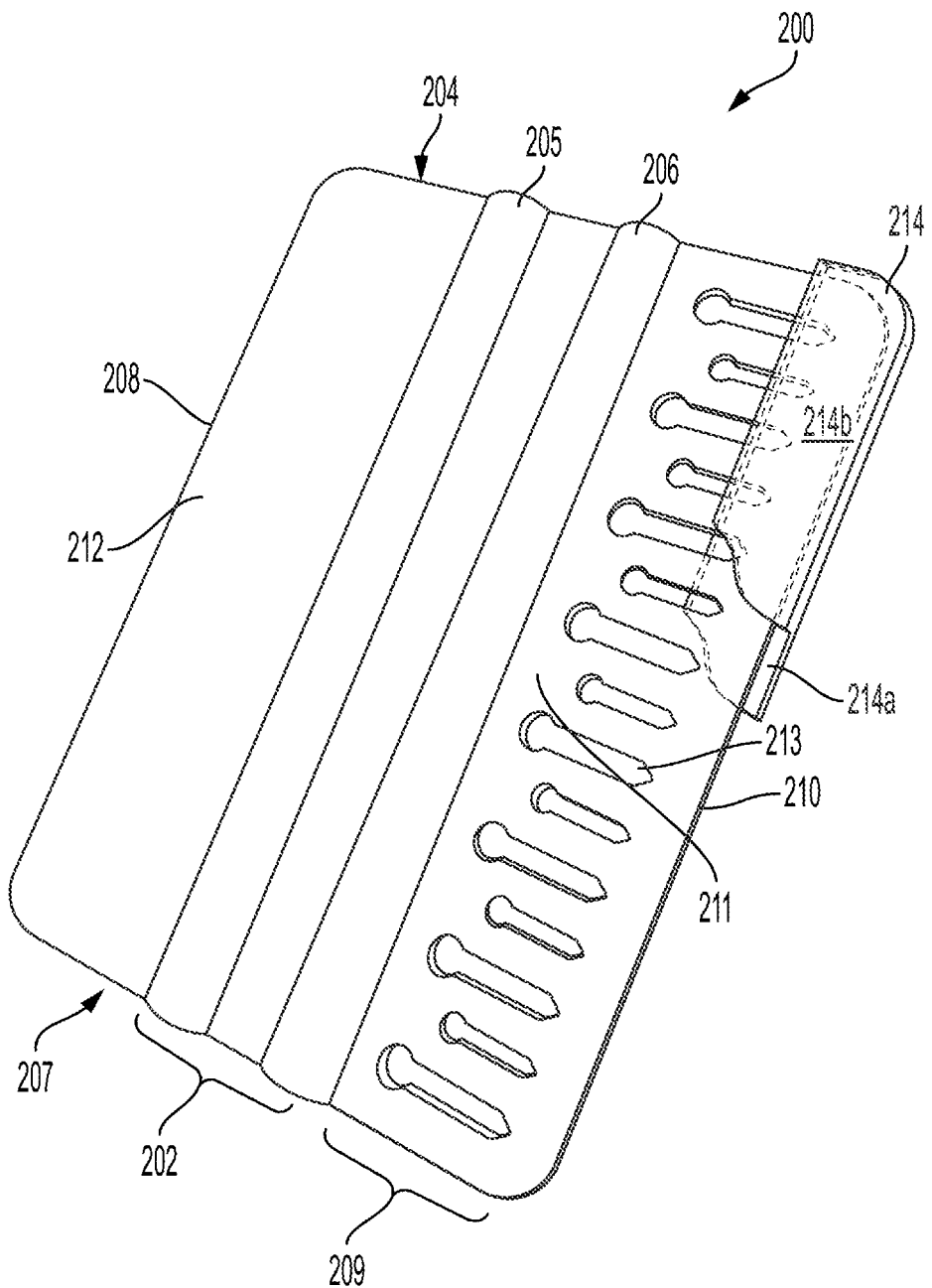
FIG. 2 is a lateral perspective view of an adhesive sheet material application squeegee according to at least one embodiment of the present disclosure.
Figure 3:
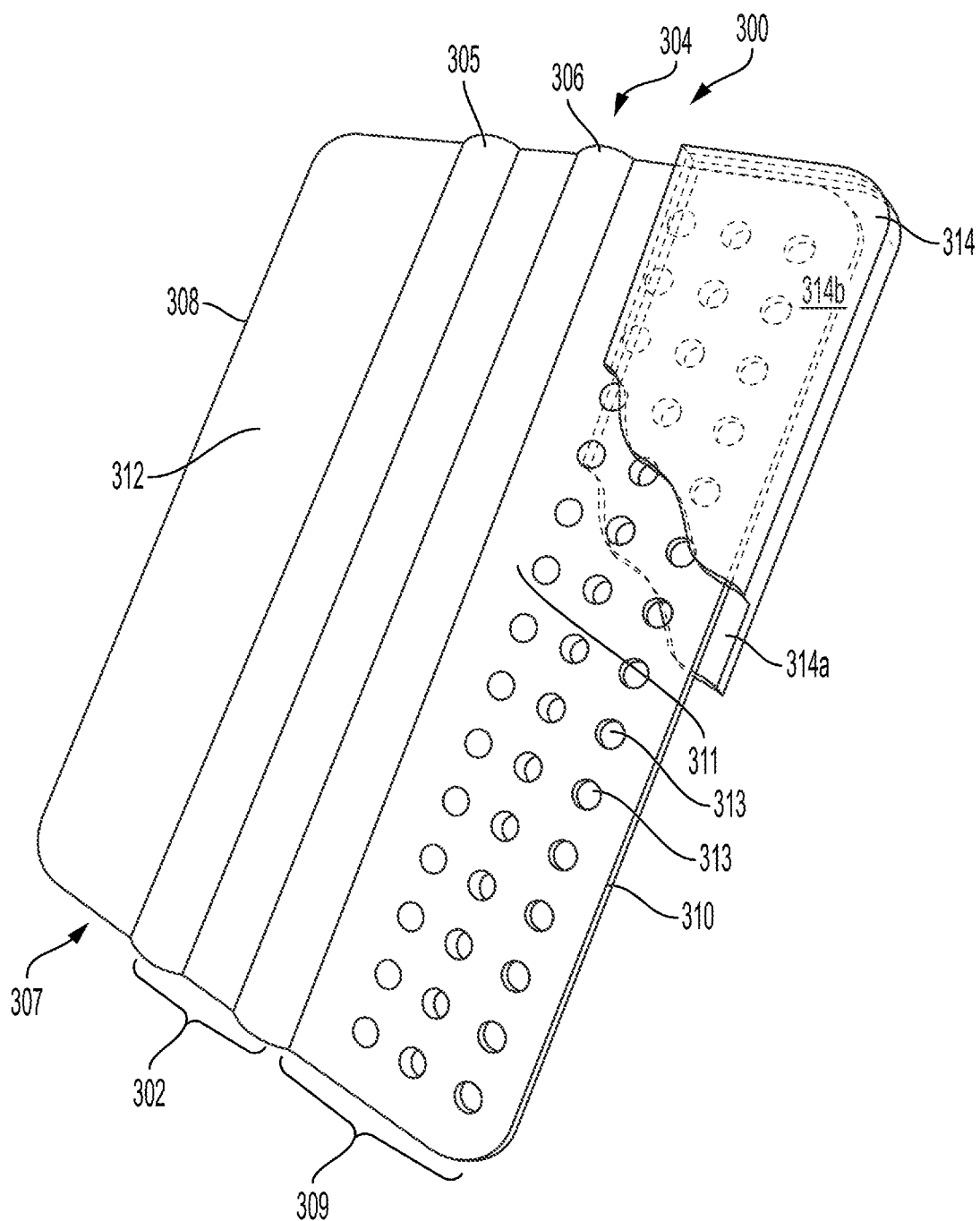
FIG. 3 is a lateral perspective view of an adhesive sheet material application squeegee according to at least one embodiment of the present disclosure.
Figure 4:
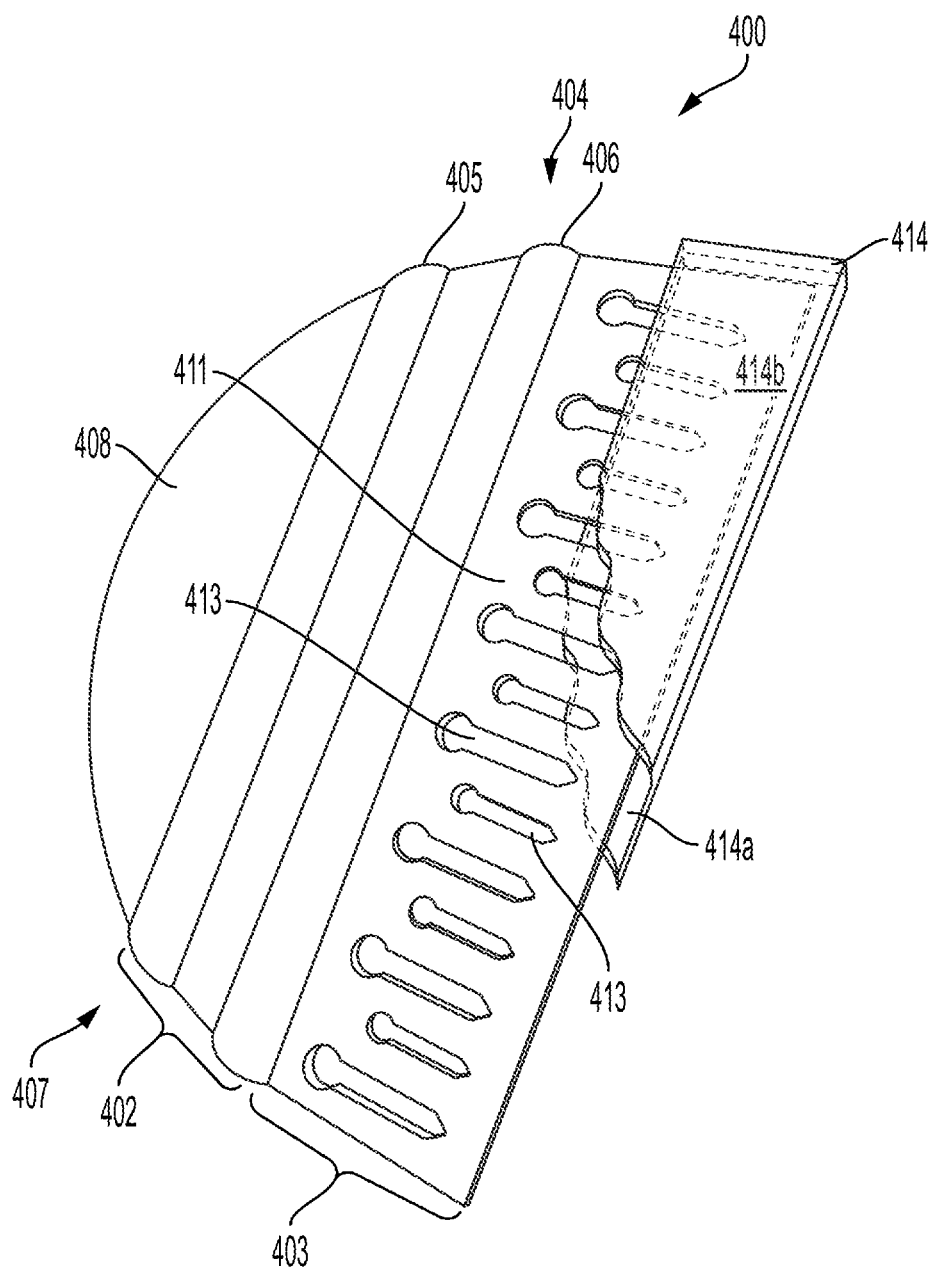
FIG. 4 is a lateral perspective view of an adhesive sheet material application squeegee according to at least one embodiment of the present disclosure.

Examples of grooves, voids and/or apertures are shown in the embodiments shown in FIGS. 2-4.

FIG. 2 shows an adhesive sheet material application squeegee 200 according to at least one embodiment of the present disclosure. The embodiment of the adhesive sheet material application squeegee 200 shown in FIG. 2 comprises a base 202, a first side 204, a second side 207, a proximal edge 208, a distal edge 210 of relatively flexible distal portion 209, and a gripping surface 212. The proximal edge 208 is straight. The distal edge 210 is straight. As shown in FIG. 2, the gripping surface 212 is flat. The bases portion 202 between the proximal edge 208 and the distal edge 210 may be provided with one or more ridges, such as 205 and 206, to engage portions of the fingers or hand as the user grips gripping surface 212. Gripping surface 212 may be provided with a cover of a relatively high tack material such as leather, rubber or the like to aid in gripping and to prevent the fingers from sliding toward the distal edge 210 during use.

The relatively flexible distal portion 209 may be provided with a lateral surface 211 comprising a series of grooves, voids and/or apertures 213 adapted to receive a liquid, and having an application edge 210. In the displayed embodiment, the apertures 213 extend through the relatively flexible distal portion 209, but may also be in the form of grooves that also hold liquid by virtue of capillary action.

The relatively flexible distal portion (or flexible blade portion) 209 may be provided with a lateral surface 211 comprising a series of grooves, voids and/or apertures adapted to receive a liquid from the interior surface upon oversaturation of the absorbent cover portion 214 (having interior and exterior surfaces 214a and 214b, respectively, and secured over at least a portion of the application edge 210; shown sectioned), and to contain that liquid, and whereby the voids or apertures are adapted to release liquid to the absorbent cover portion 214 as liquid is dispensed from the exterior surface 211.

FIG. 3 shows an adhesive sheet material application squeegee 300 according to at least one embodiment of the present disclosure. The embodiment of the adhesive sheet material application squeegee 300 shown in FIG. 3 comprises a base 302, a first side 304, a second side 307, a proximal edge 308, a distal edge 310 of relatively flexible distal portion 309, and a gripping surface 312. The proximal edge 308 is straight. The distal edge 310 is straight. As shown in FIG. 3, the gripping surface 312 is flat. The bases portion 302 between the proximal edge 308 and the distal edge 310 may be provided with one or more ridges, such as 305 and 306, to engage portions of the fingers or hand as the user grips gripping surface 312. Gripping surface 312 may be provided with a cover of a relatively high tack material such as leather, rubber or the like to aid in gripping and to prevent the fingers from sliding toward the distal edge 310 during use.

The relatively flexible distal portion 309 may be provided with a lateral surface 311 comprising a series of grooves, voids and/or apertures 313 adapted to receive a liquid, and having an application edge 310. In the displayed embodiment, the apertures 313 extend through the relatively flexible distal portion 309, but may also be in the form of cups that also hold liquid by virtue of capillary action.

The relatively flexible distal portion (or flexible blade portion) 309 may be provided with a lateral surface 311 comprising a series of grooves, voids and/or apertures adapted to receive a liquid from the interior surface upon oversaturation of the absorbent cover portion 314 (having interior and exterior surfaces 314a and 314b, respectively, and secured over at least a portion of the application edge 310; shown sectioned), and to contain that liquid, and whereby the voids or apertures are adapted to release liquid to the absorbent cover portion 314 as liquid is dispensed from the exterior surface 311.

The voids or apertures used in the many embodiments of the present invention may comprise apertures of sufficient size so as to be adapted to receive and contain a liquid through capillary action, and may be arranged in a substantially uniform array in the lateral surface.

FIG. 4 shows an adhesive sheet material application squeegee 400 according to at least one embodiment of the present disclosure. The embodiment of the adhesive sheet material application squeegee 400 shown in FIG. 4 comprises a base 402, a first side 404, a second side 407, a proximal edge 408, a distal edge 410 of relatively flexible distal portion 409, and a gripping surface 412. The proximal edge 408 is straight. The distal edge 410 is straight. As shown in FIG. 4, the gripping surface 412 is flat. The bases portion 402 between the proximal edge 408 and the distal edge 410 may be provided with one or more ridges, such as 405 and 406, to engage portions of the fingers or hand as the user grips gripping surface 412. Gripping surface 412 may be provided with a cover of a relatively high tack material such as leather, rubber or the like to aid in gripping and to prevent the fingers from sliding toward the distal edge 410 during use.

The relatively flexible distal portion 409 may be provided with a lateral surface 411 comprising a series of grooves, voids and/or apertures 413 adapted to receive a liquid, and having an application edge 410. In the displayed embodiment, the apertures 413 extend through the relatively flexible distal portion 409, but may also be in the form of cups that also hold liquid by virtue of capillary action.

The relatively flexible distal portion (or flexible blade portion) 409 may be provided with a lateral surface 411 comprising a series of grooves, voids and/or apertures adapted to receive a liquid from the interior surface upon oversaturation of the absorbent cover portion 414 (having interior and exterior surfaces 414a and 414b, respectively, and secured over at least a portion of the application edge 410; shown sectioned), and to contain that liquid, and whereby the voids or apertures are adapted to release liquid to the absorbent cover portion 414 as liquid is dispensed from the exterior surface 411.

The voids or apertures used in the many embodiments of the present invention may comprise apertures of sufficient size so as to be adapted to receive and contain a liquid through capillary action, and may be arranged in a substantially uniform array in the lateral surface.

The voids or apertures used in the many embodiments of the present invention may comprise elongated voids or apertures aligned substantially perpendicular to the application edge, and may be tapered or narrowed toward the application edge as shown in the Figures, to more effectively regulate the progression of the lubricating fluid toward the application edge and its absorbent material covering.

The absorbent cover portion may be of any absorbent material adapted to take up, hold and dispense to the sheet material, the lubricating fluid, such as a sponge material, felt or terry cloth and the like, and is affixed over the application edge so as to be in fluid communication with the grooves, voids or apertures so that the absorbent material may accept water or other lubricating fluid therefrom to replenish the absorbent material, as such fluid as dispensed from the absorbent material onto the target application surface of the sheet material.

In at least one embodiment, the width of the adhesive sheet material application squeegee may range from three (3) inches to thirteen (13) inches. In at least one embodiment, the length of the adhesive sheet material application squeegee may range from three (3) inches to thirteen (13) inches. In at least one embodiment, the thickness of the adhesive sheet material application squeegee may range from 0.03 inches to 1 inch. In at least one embodiment, the thickness of the adhesive sheet material application squeegee varies over the gripping surface and the additional ridge or ridges as described. In at least one embodiment, the thickness of the adhesive sheet material application squeegee is greater over the portion of the base covered by the cover than over the portion of the base not covered by the cover. In at least one embodiment, the radius of the edge may range from 0.03 inches to 24 inches.

The base material can be, but is not limited to being, rubber, silicone, composites, metal, leather, various polymers, polytetrafluoroethylene (PTFE), nylon, and/or various plastics. In at least one embodiment, the base comprises a flexible material. In at least one embodiment, the base comprises a relatively rigid material. In at least one embodiment, the base material comprises polytetrafluoroethylene (PTFE). In at least one embodiment, the base material comprises nylon. In at least one embodiment, the first gripping surface is rounded. In at least one embodiment, ridge or ridges as described are rounded. In at least one embodiment, at least one surface of the base is roughened to enhance grip. In at least one embodiment, at least one surface of the base is smooth. In at least one embodiment, the first gripping surface is tapered. In at least one embodiment, the tapered surfaces are thickest in the middle of the base (such as by having a ridge or ridges as described), and thinnest at the edges. In at least one embodiment, the location of the thickest and thinnest parts of the tapered surfaces varies.

The cover material can be, but is not limited to being, fabric, upholstery fabric, synthetic fabric, suede leather, leather, microfiber polyester blend, synthetic suede, wool, cotton, various synthetic materials, various polymers, and/or micro-fiber cloth. In at least one embodiment, the cover comprises a low friction material. In at least one embodiment, the cover comprises a material with a coefficient of friction less than 0.6 when used in connection with adhesive sheet material 502. In at least one embodiment, the cover comprises soft material. In at least one embodiment, the cover comprises a durable long lasting material. In at least one embodiment, the cover comprises a material that can be used on surfaces with temperatures at least up to 250 degrees Fahrenheit. In at least one embodiment, the cover comprises a material that maintains its shape and quality when wet. In at least one embodiment, the cover material comprises a microfiber polyester blend. In at least one embodiment, the cover material comprises a synthetic suede.

In at least one embodiment, the cover covers the entire perimeter of the base. In at least one embodiment the cover covers only a portion of the perimeter of the base. In at least one embodiment, the cover covers all surfaces of the base. In at least one embodiment, the cover covers only one of the following: first side, a second side, a proximal edge and a distal edge. In at least one embodiment, the cover covers only two of the following: first side, a second side, a proximal edge and a distal edge. In at least one embodiment, the cover covers only three of the following: first side, a second side, a proximal edge and a distal edge.

The cover can be secured, but is not limited to being secured, to the base with adhesive tape, glue, or thread. In at least one embodiment, the cover is sewn to the base. In at least one embodiment, material is inserted in between the cover and base before securing the cover to increase the thickness of the covered portions of the adhesive sheet material application squeegee. In at least one embodiment, one cover secured to the base. In at least one embodiment, more than one cover is secured to the base.

In at least one embodiment, the base has fewer than two ribs or ridges. In at least one embodiment, the base has more than two ribs or ridges. In at least one embodiment, the ribs or ridges comprise a rectangular prism. In at least one embodiment, the adhesive sheet material application squeegee does not have any ribs. In at least one embodiment, the ribs or ridges protrude out of only one surface of the base. In at least one embodiment, the width of the ribs or ridges can range from three 0.03 inches to 1 inch. In at least one embodiment, the length of the ribs or ridges can range from three (3) inches to thirteen (13) inches. In at least one embodiment, the thickness of the ribs or ridges can range from 0.03 inches to 1 inch. In at least one embodiment, the ribs or ridges comprise the same material as the base. In at least one embodiment, the ribs or ridges comprises a different material than the base. The ribs or ridges material can be, but is not limited to being, rubber, silicone, composites, metal, leather, various polymers, polytetrafluoroethylene (PTFE), nylon, and/or various plastics. In at least one embodiment, the ribs or ridges is/are rough. In at least one embodiment, the ribs or ridges is/are smooth. In at least one embodiment, the ribs or ridges surface is/are rounded. In at least one embodiment, the ribs or ridges is/are smooth. In at least one embodiment, the ribs or ridges surface is/are flat. In other embodiments, the ribs or ridges can be any deviation from the surface of the base, including but not limited to, bumps, groves, and notches.

In at least one embodiment, the adhesive sheet material application squeegee can be washed in a washing machine. In at least one embodiment, the adhesive sheet material application squeegee can be used when wet. In at least one embodiment, the adhesive sheet material application squeegee can be used when the adhesive sheet material is wet. In at least one embodiment, the adhesive sheet material application squeegee comprises materials that can be used on surfaces with temperatures at least up to 250 degrees Fahrenheit.

To use the adhesive sheet material application squeegee, in one embodiment of the present disclosure, a user places the adhesive sheet material on a desired surface. In at least one embodiment, the adhesive sheet material is placed over a surface contour. In at least one embodiment, the surface is cleaned prior to applying the adhesive sheet material. In the next step, a user wets the grooves, voids or apertures such that they accepted water or other lubricating fluid therefrom, and the absorbent material is likewise wetted.

The application edge with the absorbent material is placed against the target application surface of the sheet material such that the absorbent material applies pressure using the adhesive sheet material application squeegee to the adhesive sheet material until the adhesive sheet material is adequately mated to the target surface. In at least one embodiment, the user places the absorbent material-covered edge of the adhesive sheet material application squeegee on the adhesive sheet material. In at least one embodiment, the adhesive sheet material application squeegee is used to apply adequate pressure to form the adhesive sheet material to fit securely around and in a surface contour. In at least one embodiment, a user heats the adhesive sheet material using a heat source, including, but not limited to, an electric heat gun or a propane or other combustible gas torch, before the user applies pressure using the adhesive sheet material application squeegee. In at least one embodiment, a user wets the adhesive sheet material with the absorbent material-covered edge of before or even as the user applies pressure using the adhesive sheet material application squeegee. The liquid used to wet the adhesive sheet material or the adhesive sheet material application squeegee, can be but is not limited to being, water and soapy water. In an optional further step, a user cuts and removes the excess adhesive sheet material after the surface has been covered in the desired pattern.

Although the present invention has been described and illustrated with respect to a specific embodiments and a specific use therefore, it is not to be so limited since modifications and changes can be made therein which are within the full intended scope of the invention.

While various embodiments of an adhesive sheet material application squeegee and methods for using the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. An adhesive sheet material application squeegee for applying a liquid to a surface, comprising:
   a. a relatively rigid gripping handle portion;
   b. a relatively flexible squeegee blade portion extending from said relatively rigid gripping handle portion, said relatively flexible squeegee blade portion having a lateral surface comprising a series of voids or apertures of sufficient size so as to be adapted to receive and contain said liquid through capillary action, and having an application squeegee edge, said series of voids or apertures arranged in a substantially uniform array in said lateral surface; and
   c. an absorbent cover portion having an interior surface and exterior surface and secured over said application squeegee edge, whereby said series of voids or apertures are adapted to receive said liquid from the interior surface upon oversaturation of said absorbent cover portion, and to contain said liquid, and whereby said series of voids or apertures are adapted to release said liquid to said absorbent cover portion as said liquid is dispensed from said exterior surface.

2. An adhesive sheet material application squeegee according to claim 1 wherein said series of voids or apertures are arranged in a substantially uniform array in said lateral surface.

3. An adhesive sheet material application squeegee according to claim 1 wherein said series of voids or apertures comprise elongated voids or apertures aligned substantially perpendicular to said application squeegee edge.

4. An adhesive sheet material application squeegee according to claim 1 wherein said series of voids or apertures comprise elongated voids or apertures aligned substantially perpendicular to said application squeegee edge and tapered toward said application squeegee edge.

5. An adhesive sheet material application squeegee according to claim 1 wherein said relatively flexible squeegee blade portion comprises two opposing lateral edges continuous with said application squeegee edge through curved corners.

6. An adhesive sheet material application squeegee according to claim 1 wherein said relatively flexible squeegee blade portion comprises two opposing lateral edges, and wherein said absorbent cover portion is secured over at least a portion of said two opposing lateral edges.

7. The adhesive sheet material application squeegee of claim 1, wherein said relatively rigid gripping handle portion comprises a gripping handle surface and a first rib protruding from said gripping handle surface.

8. The adhesive sheet material application squeegee of claim 7, wherein said first rib comprises a rounded surface portion.

9. The adhesive sheet material application squeegee of claim 1, wherein said absorbent cover portion is secured to said application squeegee edge with adhesive.

10. The adhesive sheet material application squeegee of claim 1, wherein the absorbent cover portion is sewn to said application squeegee edge.

11. The adhesive sheet material application squeegee of claim 1, wherein said application squeegee edge is arcuate.

12. The adhesive sheet material application squeegee of claim 11, wherein said application squeegee edge defines a symmetric convex arc.

13. The adhesive sheet material application squeegee of claim 11, wherein said application squeegee edge defines an asymmetric convex arc.

14. The adhesive sheet material application squeegee of claim 1, wherein said absorbent cover portion comprises a material selected from the group consisting of microfiber cloths, suedes, leathers, wool, cotton and hook and loop nylons.

15. The adhesive sheet material application squeegee of claim 1, wherein said relatively rigid gripping handle portion comprises a polymeric material.

16. The adhesive sheet material application squeegee of claim 15, wherein said relatively rigid gripping handle portion comprises a material selected from the group consisting of rubber, silicon, polytetrafluoroethylene and nylon.

17. The adhesive sheet material application squeegee of claim 1, wherein said relatively flexible squeegee blade portion comprises a polymeric material.

18. The adhesive sheet material application squeegee of claim 17, wherein said relatively flexible squeegee blade portion comprises a material selected from the group consisting of rubber, silicon, polytetrafluoroethylene and nylon.

\* \* \* \* \*